Aug. 4, 1959  G. H. MYRICK  2,897,554
INHALATOR
Filed April 3, 1956  2 Sheets-Sheet 1
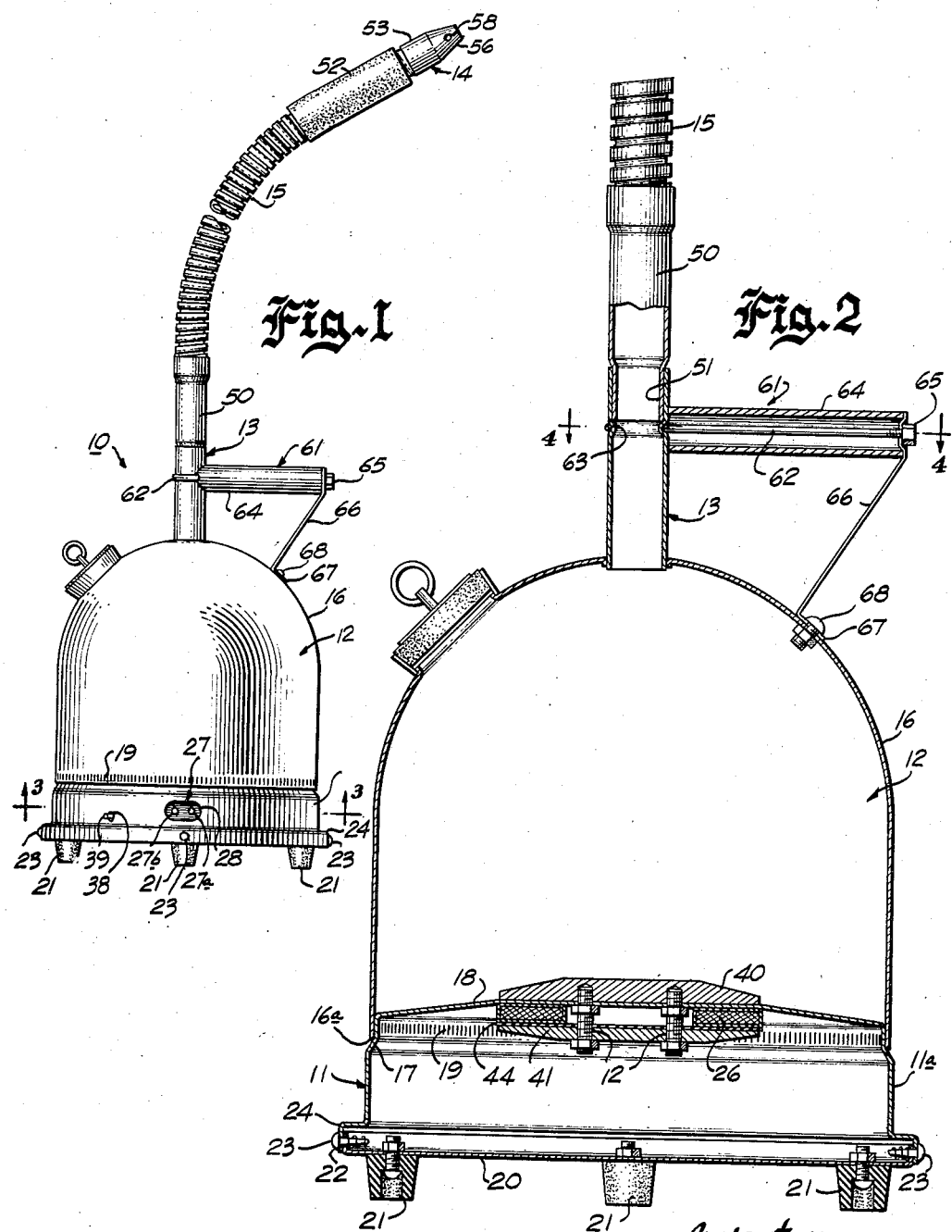
Inventor
George H. Myrick
by
Mason Kolehmainen, Rathburn and Wyss.
Attorneys.

Aug. 4, 1959  G. H. MYRICK  2,897,554
INHALATOR
Filed April 3, 1956  2 Sheets-Sheet 2
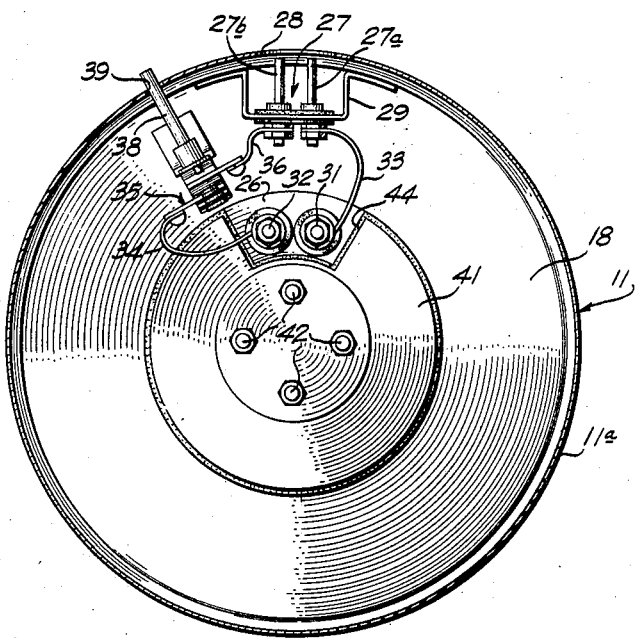
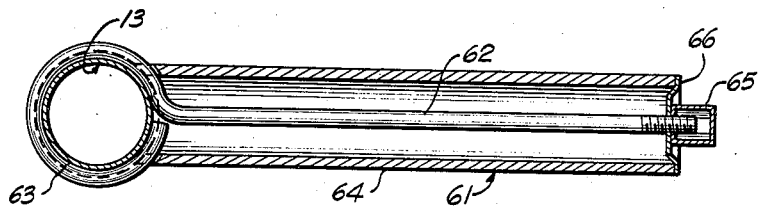
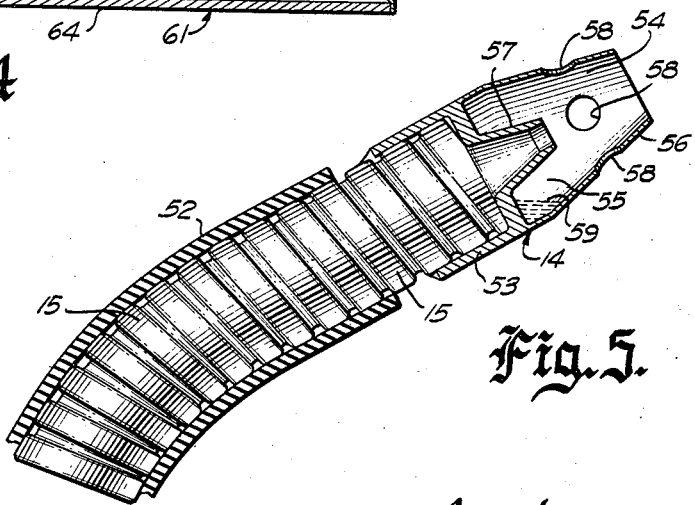
Inventor
George H. Myrick
by
Mason, Kolehmainen, Rathburn and Wyss.
Attorneys.

United States Patent Office 2,897,554
Patented Aug. 4, 1959

2,897,554

INHALATOR

George H. Myrick, Rochester, Minn.

Application April 3, 1956, Serial No. 575,856

7 Claims. (Cl. 21—119)

The present invention is related to inhalators or vaporizers, and more particularly to portable inhalators or vaporizers suitable for use in the treatment of respiratory ailments.

Although inhalators designed for use in hospitals and vaporizers or inhalators designed for use in homes have been commercially available for many years, they have left something to be desired. For example, while the inhalators designed primarily for use in hospitals have the advantage of sturdiness of construction and reliability of operation, they have the disadvantage of being expensive to manufacture and somewhat difficult to handle. On the other hand, the inhalators which are designed primarily for use in the home, while being relatively inexpensive to manufacture and light in weight, are fragile and thus readily susceptible to damage. Furthermore, this latter type is frequently unreliable in operation.

Therefore, a principal object of the present invention is to provide a new and improved inhalator which is light in weight, reliable in operation, sturdy in construction and inexpensive to manufacture, is also suitable for use in homes as well as in hospitals.

A further object of the present invention is to provide a new and improved inhalator which is adapted thoroughly to mix a large amount of air with the vapor which is developed and to generate sufficient pressure to carry the mixture a considerable distance away from the inhalator.

A still further object of the present invention is to provide a combined mixing and delivery nozzle which is adapted thoroughly to mix a large amount of air with the vapor generated in an inhalator and to direct it in a predetermined direction.

Another object of the present invention is to provide a new and improved dripless mixing nozzle.

Still another object of the present invention is to provide a new and improved inhalator comprising a closed vessel which has an attractive appearance, is light in weight, and which may be manufactured at a relatively low cost.

Briefly, the above and further objects are realized in accordance with the present invention by providing a thin walled vaporizing vessel formed of an upper dome telescopically secured by welding to a thin walled member having the general configuration of an inverted cup.

In accordance with another aspect of the invention there is provided on the end of a delivery tube a combined mixing chamber and delivery nozzle including an annular condensate collecting chamber surrounding a discharge port in such manner as to be operated at a pressure less than that of the surrounding atmosphere. The mixing chamber is apertured and located adjacent the condensate collecting chamber so that air which is drawn into the mixing chamber from the surrounding atmosphere passes through the condensate collecting chamber thereby evaporating and discharging the condensate into the mixing chamber from which it is exhausted with the vapor and air mixture.

The invention both as to its organization and operation may best be understood by reference to the following description taken in connection with the accompanying drawings, in which:

Fig. 1 is an elevational view of an inhalator embodying the present invention;

Fig. 2 is an enlarged vertical cross-sectional view of the inhalator of Fig. 1;

Fig. 3 is a horizontal cross-sectional view of the inhalator of Fig. 1 taken along the line 3—3 thereof;

Fig. 4 is an enlarged sectional view of the handle of the inhalator taken along the line 4—4 of Fig. 2; and Fig. 5 is an enlarged cross-sectional view of a combined mixing and delivery nozzle attached to the end of a flexible delivery tube.

Referring now to the drawings and particularly to Fig. 1 thereof, an inhalator or vaporizer 10 comprises a combined base and electric component housing 11, a vessel 12 for containing a liquid to be vaporized, a vapor discharge conduit 13, a flexible delivery tube 15 and a combined mixing and delivery nozzle 14. The top of the housing 11 constitutes the bottom of the vessel and the downwardly extended skirt portion 11a may enclose an electric heating element and suitable controls therefor for elevating the temperature of the liquid in the vessel 12 to the boiling point to generate the vapor which is exhausted through the delivery conduit 13 to the nozzle 14 where a generous supply of air is mixed with the vapor before delivery to the patient.

Considering the inhalator 10 in greater detail, and referring to Figs. 2 and 3, it may be seen that the base 11 comprises a dished top 18 and a skirt 11a. The base is telescopically fitted into the lower end of a thin walled dome 16 to constitute the bottom of the vessel 12. The dome 16 is suitably bonded as by a seam weld 19 to the skirt 11a and in order to facilitate the relative positioning of the base 11 and the dome 16 prior to welding, an annular shoulder 17 may be provided in the skirt 11a.

In accordance with the latest welding techniques a preferred method of seam welding together two metal sheets is to partially overlap the sheets to be joined and to then roll the junction between opposed circular welding electrodes which resemble wheels. For the purpose of enabling the use of this welding technique for bonding the base 11 to the dome 16, the top 18 is provided with a lower generally concave surface so as to provide sufficient space in the housing 11 to permit one of the circular welding electrodes to be positioned against the inner wall of the skirt 11a opposite the area at which the seam 19 is to be made. Moreover, the top 18, being dished, may be formed of sheet steel or other similar thin material and yet be sufficiently sturdy to support a large quantity of liquid in the vessel 12 without deformation. In a successful reduction to practice of the present invention the dome 16 and the housing 11 were constructed of stainless steel having a thickness of the order of 0.030 of an inch.

As shown, the inhalator 10 is supported on a plurality of feet 21 suitably attached to a circular bottom plate 20 secured in the bottom of the housing 11. The plate 20 has an upturned annular flange 22 which is attached by means of a plurality of screws 23 in the enlarged bottom portion 24 of the housing 11.

In order to heat the contents of the vessel 12 there is provided a suitable heater comprising an electrical heating coil 26 which is electrically connected to a suitable connector 27 mounted over an aperture 28 in the side of the housing 11. As best shown in Fig. 3, a bracket 29 may be welded to the housing 11 adjacent the aperture 28 for supporting a pair of terminal posts 27a and 27b of the connector 27. Obviously, the posts 27a and 27b are insulated from the bracket 29 which is most conveniently formed of sheet metal. The terminals 31 and 32 of the heater 26 are operatively connected through a temperature responsive or thermostatically operated switch 35 to the terminal posts 27a and 27b of the connector 27 so that the energization of the heater 26 may be interrupted when the contents of the vessel 12 has completely evaporated. More specifically, the heater terminal 31 is connected through an insulated conductor 33 to the terminal post 27a, and the heater terminal 32 is connected through an insulated conductor 34, the switch 35 and an insulated conductor 36 to the terminal post 27b. The temperature responsive switch 35 is mounted directly on the top 18 of the housing 11, so that the temperature of the top portion 18 controls the current to the heater 26. Consequently, when the liquid in the vessel 12 has been exhausted and the temperature of the top 18 increases above a predetermined value, an interruption in the circuit between conductors 34 and 36 is effected by the switch 35 thereby to cut off the supply of current to the heater 26. A rod 38 extends from the switch 35 through a suitable aperture 39 in the skirt 11a so as to permit manual resetting of the switch 35 after the vessel 12 has been refilled and is to be used.

Since the temperature responsive switch 35 does not constitute a part of the present invention and since any suitable resettable thermostatically controlled switch may be used in the inhalator of the present invention, the switch 35 is not described in detail.

In accordance with one aspect of the present invention, the heater 26 is mounted directly on the top 18 by means of a pair of mounting disks 40 and 41 which are respectively mounted on the top and bottom sides of the top 18 and are forced together by means of a plurality of bolts 42 to clamp the heater 26 between them. The disk 40, which is positioned above the top 18, is thus disposed within the vessel 12 in direct association with the liquid to be vaporized. By constructing the disks 40 and 41 of a high mass material such as, for example, cast iron, the heat generated by the heater 26 is concentrated near the center of the vessel 12. Where necessary, an insulating disk 44 may be positioned between the coil 26 and the lower disk 41.

In accordance with another aspect of the invention, the lower disk 41 and the heater 26 have a substantially smaller diameter than the internal diameter of the skirt 11a so as to provide a large annular space between the heater 26 and the skirt 11a. Consequently, after the heater 26 has been secured to the top 18 a circular welding electrode may be positioned within the housing 11 for welding the seam 19 in the manner heretofore described.

The vapor which is exhausted from the vessel 12 through the upper portion of the discharge conduit 13 may be coupled through the flexible delivery tube or gooseneck 15 to the mixing nozzle 14. The gooseneck 15 is provided at its lower end with a coupling member 50 having an end 51 of reduced cross-section for telescopic reception in the upper end of the conduit 13. A slip fit is provided between the conduit 13 and the coupling member 50 so that those parts may be easily disconnected without the use of tools for cleaning, storing or other purposes.

Because the flexible delivery conduit 15 is preferably formed of metal and, therefore, quite hot under normal operating conditions, a heat insulating sleeve 52 may be provided over a portion thereof for facilitating manual directing of the exhausted vapor from the nozzle 14.

As is well known in the art, the vapor which passes from the vessel 12 through the discharge conduit 13 is relatively hot, being of the order of 212 degrees Fahrenheit when a pure steam vapor is used. Obviously, this steam is too hot for direct application to the patient, and consequently, to cool it, a large amount of air at room temperature is thoroughly mixed with vapor as it passes through the nozzle 14 before being exhausted toward the face of the patient.

Referring to Fig. 5, it may be seen that in accordance with the invention the nozzle 14 includes a cylindrical coupling portion 53 into which the upper end of the gooseneck 15 is secured, a mixing chamber 54 and an annular condensate collecting and evaporating chamber 55. The nozzle 14 further includes a conical delivery nozzle 56 and a conical nozzle or venturi funnel 57 which directs the vapor from the gooseneck 15 into the mixing chamber 54. Since the nozzle 57 is conical, the velocity of the vapor is increased before it is directed past a plurality of apertures 58 in the wall of the nozzle portion 56 opposite the mixing chamber 54. Therefore, as the vapor moves across the apertures 58 a large amount of the surrounding air is sucked in through the apertures 58 for thorough mixing with the vapor in the chamber 54. The diameter of the output end of the nozzle 57 is relatively small, being of the order of 0.187 inch for a delivery tube having a diameter of the order of one inch, so that efficient drawing of air into the mixing chamber 54 through the apertures 58 is achieved. However, with a high velocity nozzle of this type there is inherently a certain amount of leakage.

Therefore, in accordance with an important aspect of the present invention the venturi nozzle 57 extends a substantial distance into the mixing chamber so as to define the annular recess 55 into which all of the vapor which condenses in the nozzle 14 drains. If, for example, the nozzle 14 is in the position shown in Fig. 5, a puddle of condensate 59 collects, as shown, in the lower portion thereof. Since a low pressure area is created in the recess 55 by the high velocity vapor passing outwardly from the venturi nozzle 57, some of the air which is sucked through the apertures 58 passes across the surface of the puddle 59 before joining with the main stream of vapor and air passing out of the nozzle portion 56 toward the patient. Therefore, the condensate in the puddle 59 is constantly evaporated by this stream of air. Moreover, since the lower end of the nozzle 14 and thus the puddle 59 is maintained, by the hot vapor, at a temperature only slightly less than the vapor point of the liquid in the vessel 12, rapid evaporation of the puddle 59 is effected so that the amount of liquid collected in the nozzle 14 is never sufficient to drip out of the nozzle 14 through the apertures 58.

Because the conduit 13, gooseneck 15 and the lower part of the nozzle are all relatively large in diameter, the vapor which passes therethrough is at a low velocity, and any condensate which may collect on the inner surfaces of these members returns freely under the force of gravity to the vessel 12. Moreover, because a vapor outlet tube or injector nozzle need not be mounted within the conduit 13 as shown in Patent No. 2,184,679—Myrick, the returning condensate does not have to bypass such a nozzle and the conduit 13 may, therefore, terminate at the dome 16. It may thus be seen that by providing a combined mixing and delivery nozzle at the output end of the delivery tube, the construction of the inhalator is simplified and the manufacturing cost is reduced.

As shown, the portable inhalator 10 may be conveniently transported by means of the bail-type handle 61 which is secured to the conduit 13 near the upper end thereof by an I bolt 62 which surrounds the neck of the conduit 13 and is received in an annular groove 63 provided therein. The inner wall of the groove 63 also provides a stop against which the coupling member 50 is pressed when the gooseneck 15 is assembled to the conduit 13. The handle 61 further includes a cylindrical grip or sleeve 64 which surrounds the body portion of the bolt 62 and which is pressed against the conduit 13 by the action of a nut 65 which urges the upper end of a bracket 66 against the end of the sleeve 64. The bracket 66 has an off-turned flange 67 at the lower end thereof for facilitating securing of the bracket to the dome 16 by means of a bolt 68 or by welding (not shown).

While the present invention has been described in connection with a particular embodiment thereof, it will be understood that those skilled in the art may make many changes and modifications without departing from the true spirit and scope of the present invention. Therefore, in the appended claims it is intended to cover all such changes and modifications which fall within the true spirit and scope of the invention.

What is claimed as new and is desired to be secured by Letters Patent of the United States is:

1. An inhalator comprising, means for containing a quantity of a material to be vaporized, means for heating at least a portion of said material to the vapor point whereby vapor is released from the material, a single nozzle for mixing said vapor with air from the surroundings and delivering the mixture to a patient, and flexible means interconnected between said nozzle and said first named means for coupling said vapor from the vessel to the nozzle.

2. An inhalator comprising, means for containing a quantity of a material to be vaporized, means for heating at least a portion of said material to the vapor point whereby vapor is released from the material, a high velocity type combined mixing and delivery nozzle, said nozzle including a condensate collecting and evaporating receptacle, and means interconnected between said nozzle and said first named means for coupling said vapor from the vessel to the nozzle.

3. The nozzle of claim 2 wherein said mixing chamber and said tube are conical.

4. A dripless mixing nozzle comprising, a conical mixing chamber, a vapor inlet to said chamber, said inlet including a conical venturi funnel extending a substantial distance within said chamber, said venturi funnel being coaxial with said mixing chamber, means defining an imperforate evaporating chamber between said funnel and the wall defining said chamber, and aperture defining means in said chamber for supplying air from the surroundings to the mixing chamber where it is mixed with vapor supplied through said inlet.

5. A nozzle for use in connection with an inhalator, said nozzle comprising an open ended mixing chamber, a vapor inlet extending through an imperforate wall in the bottom of said chamber toward said open end, said inlet including a tube extending a substantial distance from said wall into said chamber, and said chamber being perforated near the end of said tube, the perforations being disposed only at a substantial distance from said wall, whereby air from the surroundings is mixed with vapor to provide a substantially droplet-free mixture od vapor and air for delivery to a patient from the open end of said mixing chamber and an evaporating chamber disposed in said nozzle.

6. A mixing nozzle comprising, a conical delivery nozzle enclosing a mixing chamber, said nozzle having perforations in an annular area intermediate the ends thereof, an imperforate annular wall near the inlet side of said nozzle, said wall being substantially parallel to the principal plane of said annular area, and a conical inlet nozzle extending through the center of said wall a substantial distance into said delivery nozzle.

7. An inhalator comprising a vaporizing chamber enclosed by an upper dome telescopically positioned over the upper portion of an inverted cup-shaped housing, the portion of said housing which is positioned within said dome being rounded, a heater mounted centrally of the rounded portion of said housing for heating the contents of said vessel, a flexible delivery tube protruding from the top of said dome and communicating with the interior thereof, and a combined mixing chamber and delivery nozzle disposed on the outer end of the flexible tube for mixing the vapor generated in said vessel with a generous amount of the surrounding atmosphere before directing it in a predetermined direction.

References Cited in the file of this patent
UNITED STATES PATENTS

| | | |
|---|---|---|
| 1,958,811 | Boehme | May 15, 1934 |
| 2,184,679 | Myrick | Dec. 26, 1939 |
| 2,522,718 | Huck | Sept. 19, 1950 |
| 2,582,735 | Alaj | Jan. 15, 1952 |